United States Patent [19]

Schmid

[11] Patent Number: 4,467,848
[45] Date of Patent: Aug. 28, 1984

[54] MACHINE FOR CUTTING DOWN LOGS TO A DESIRED DIAMETER

[75] Inventor: Ludwig Schmid, Altötting, Fed. Rep. of Germany

[73] Assignee: Maschinenfabrik Esterer AG, Altötting, Fed. Rep. of Germany

[21] Appl. No.: 399,384

[22] Filed: Jul. 19, 1982

[51] Int. Cl.³ ............................................. B27C 5/08
[52] U.S. Cl. ........................................ 144/4; 51/43; 82/9; 144/208 E; 144/340; 409/199
[58] Field of Search .................. 144/4, 208 R, 208 E, 144/340; 409/199; 51/43, 120; 82/9, 20

[56] References Cited

U.S. PATENT DOCUMENTS

| | | | |
|---|---|---|---|
| 2,715,806 | 8/1955 | Hancock, Jr. | 51/43 |
| 3,522,826 | 8/1970 | Ervin | 144/4 |
| 3,817,149 | 6/1974 | Reutlinger | 409/199 |
| 4,257,724 | 3/1981 | Blaimschein et al. | 409/199 |

*Primary Examiner*—W. D. Bray
*Attorney, Agent, or Firm*—Robert W. Fiddler

[57] ABSTRACT

A log shaping machine for cutting logs to a desired diameter and for cutting off root outgrowths, has a cutting ring with inwardly pointing tools which rotate with the ring. For the purpose of changing the effective cutting diameter of the tools the ring is rotatably supported on a gyratory frame moving generally parallel to itself so that each point of the gyratory frame moves periodically on a circle while the orientation in space of the gyratory frame is maintained. This gyratory motion of the gyratory frame may undergo adjustment in size by changing the radius of the said circle within the range from zero up to a maximum value by means of adjustable eccentrics on which the gyratory frame is suspended and which are also used for driving the gyratory frame.

6 Claims, 5 Drawing Figures $d=D$ $e'=l-e=0$ $d=D-2\times e'$ $d=D-2\times e'max.=dmin.$ $e'=l+e=e'max$ ns of the invention, to be seen in the figures. These
MACHINE FOR CUTTING DOWN LOGS TO A DESIRED DIAMETER

BACKGROUND OF THE INVENTION

The present invention relates to log shaping machines for cutting logs to a desired diameter.

Such prior machines for reducing the size of overwide parts of logs to a desired diameter have employed a cutting ring rotatably supported on a machine frame so that is centered on a line along which the log is moved. Thus, the diameter to which the log parts are cut down on their way through the machine to the next wood processing machines is dependent on the diameter of the cutting ring.

In many cases the diameter of the cutting ring may be changed in known machines by adjustment of the positions of the wood cutting tools in their supports or changing over the tools so that the upper diameter limit of a log coming from the machine may be changed. In this case it is not possible for logs to be processed if there is a change in the upper diameter limit from log to log, without stopping the machine and changing the tool. In fact, the logs have to be sorted before cutting into different diameter groups and the tools can be changed after completing the shaping of one group of logs. The adjustment or exchanging of the tools is not readily undertaken and is a time consuming operation.

Because the diameters of the individual logs may be greatly different even in a sorted group, it is frequently likely for logs with a generally small average diameter, but with strong root outgrowths at the lower end to go through the known machine without such outgrowths being cut back, or only being cut back to a small degree. Such root outgrowths at the "lower" end of the log will then be a cause of trouble in later processing machines, for example in a gang mill, because they are cut away as wedges which in the automatic separating systems for turning out irregular wood or the like are not securily sensed and automatically cleared and may even frequently be the cause of damage to such separating systems.

Furthermore apparatus has been designed in the prior art which is different than the apparatus of the present invention in that a rotating support having the same function as the cutting ring has a number of levers, which when changed in angle in relation to the support in operation of the apparatus, may be placed at different distances from the centerline along which the log is moved, each lever at this end having a rotating cutting head which is moved along a line round the log for cutting the same, the cutting head having its own motor, which is fixed to the other end of the lever. This apparatus is very complex in design and trouble conditions are very likely because of this. In their general design such cutting down systems are generally like debarking machines, but whereas in debarking machines the levers have fixed tools and only have to be pushed elastically towards the line along which the log is moved, in the case of the reducing machines in question the levers have to be able to undergo adjustment into different, exact positions, the same for each lever and the levers have to be locked exactly in such positions. Furthermore it is necessary for the motors turning with the support to be supplied with power. Such a system may only be produced, at least in theory, with a very complex design.

SUMMARY OF THE INVENTION

One purpose of the invention is that of making a better log shaping machine which permits adjustment of the machine to produce different log diameters without stopping the machine.

A further purpose of the invention is that of not only being able to reduce the diameter of the log to the greatest working breadth of later processing machines but further being able to cut off root outgrowths and other parts running out from the log to such a degree that no thick, and more specially short, wedges of wood in the side part of the log are produced in the gang mill. A further purpose is that of increasing the efficiency of any debarking machine coming after the machine of the invention. For effecting these and other purposes the machine has a gyratory frame for supporting the cutting ring and its driving unit and changing the position thereof relative to the center the line along which the log is moved and there is furthermore a system for gyratorily driving said frame with the chance of adjustment of gyratory motion of said frame between zero and an upper limit to the gyratory motion.

In the machine of the present invention the rotating cutting ring is subject to gyratory movement around the center line of advance of the log so that the effective cutting diameter is subject to being greater or less than the cutting ring diameter. It is not necessary for the tools to be changed in position on the cutting ring even if the logs have been sorted into different diameter groups.

"Gyratory motion" means that the frame is moved in such kind that each mass point of it described periodically in general circles while the orientation in space of the frame is essentially maintained or, in other words, the frame is moved periodically parallel to itself on a circular path in a plane perpendicular to the center line of advance.

LIST OF FIGURES

An account will now be given of two working examples of the invention, to be seen in the figures. These embodiments are the best mode of constraction and operation known.

FIG. 4 is a diagrammatic view of the eccentric in different adjustments and of the cutting work then produced on a log.

DETAILED ACCOUNT OF WORKING EXAMPLES OF THE INVENTION

Figure 1:
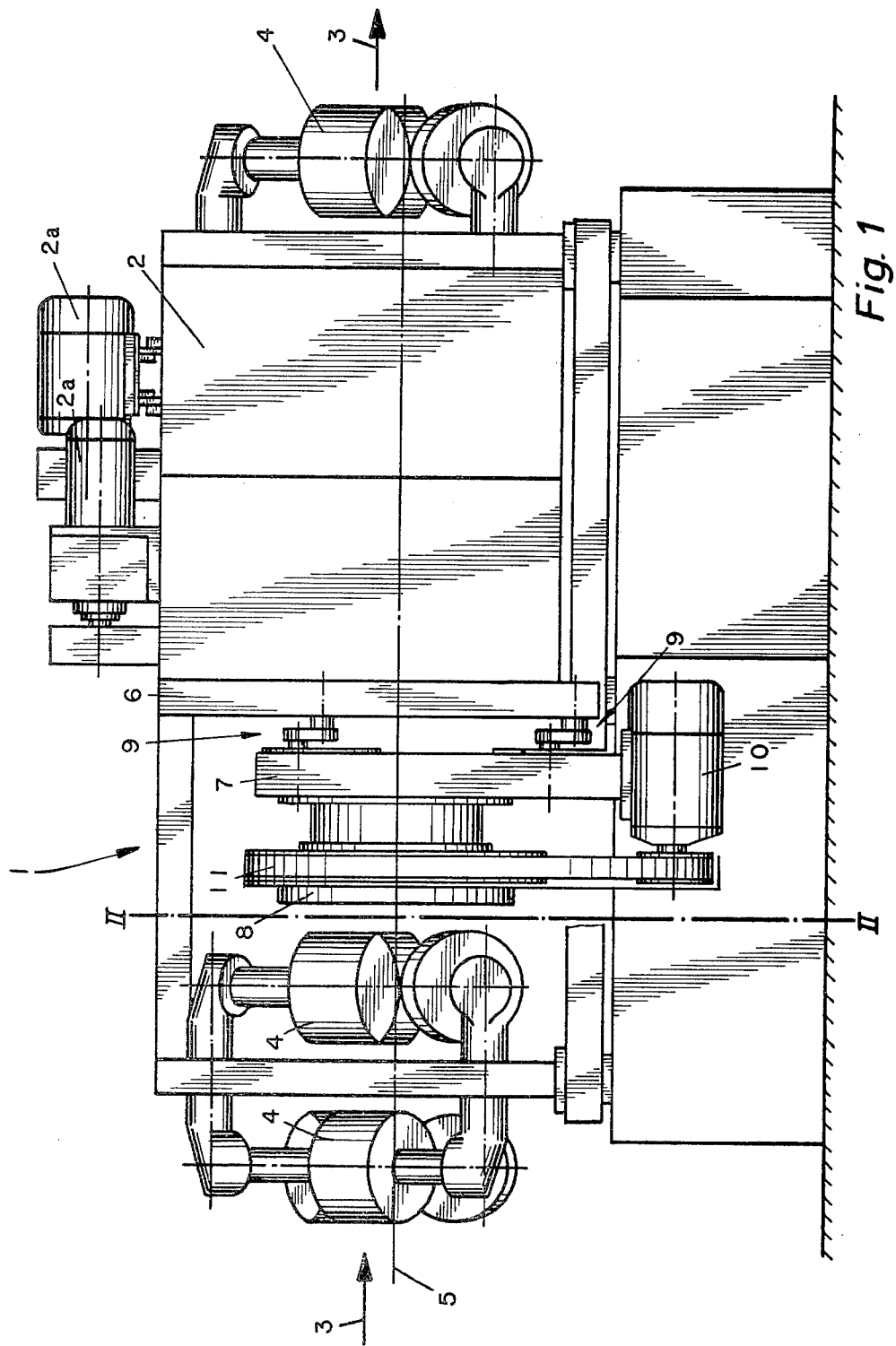
FIG. 1 is a diagrammatic side view of a machine of the present invention placed in front of the inlet end of a debarker.
Figure 2:
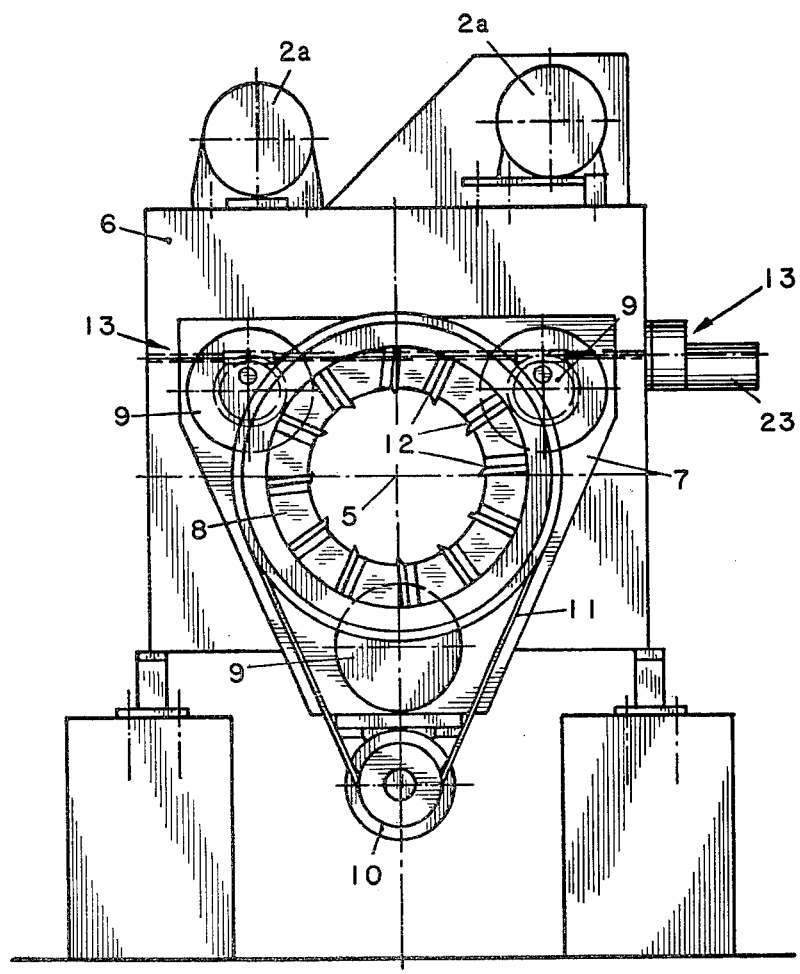
FIG. 2 is an end-on view of the machine to be seen in FIG. 1 as from the plane II—II.
Figure 3:
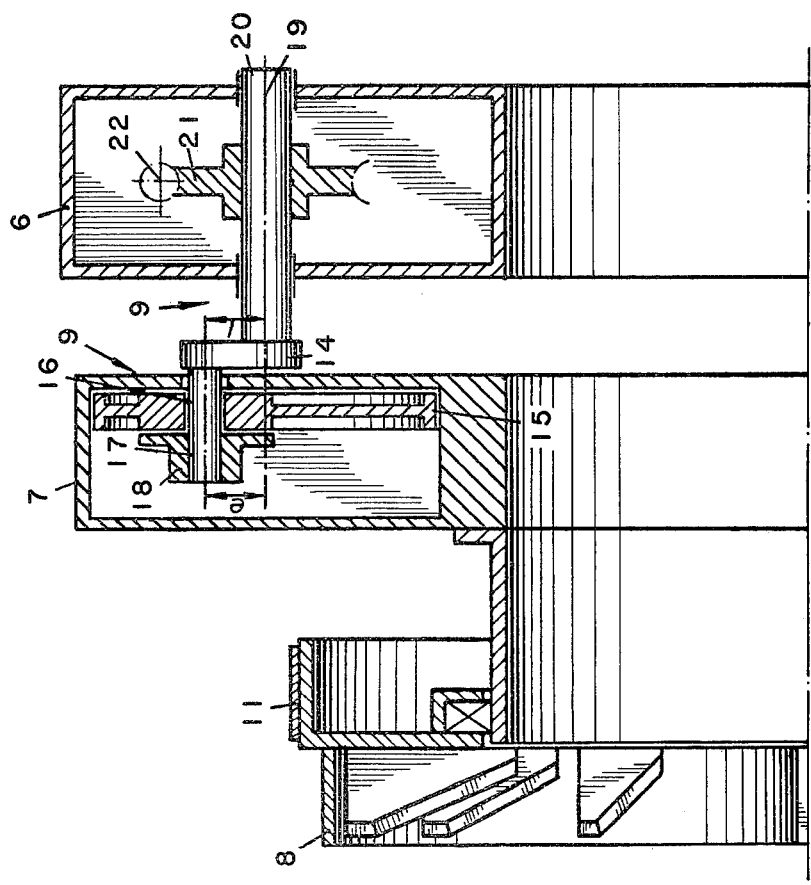
FIG. 3 is a longitudinal section through one of the eccentrics used in the machine of FIGS. 1 and 2, together with parts of the machine near thereto.

The machine 1 to be seen in FIGS. 1 to 3 is united with a ring debarker 2, not to be seen in detail and having its own separate driving system 2a, logs being moved in the direction of arrow 3 through the machine 1 into the debarker 2.

On moving through the machine 1 and through the debarker 2 the log is centered by driving and guiding rollers 4 on a center line 5. The driving and guiding rollers are placed in front of the inlet end of the machine and after the outlet end of the debarker. Normally there are furthermore one or two groups of such rollers between the machine 1 and the debarker 2, although such rollers are not to be seen in the figures.

The machine 1 for cutting down the logs to a given diameter or trimming them has as its main units a fixed support 6, a gyratory frame 7 and a cutting ring 8 for reducing the logs to round shape.

On support 6 the gyratory frame 7 is supported, on the log's input side, by three eccentrics 9 (of which details will be seen in FIG. 3), whose effective eccentricity e' may be changed as desired. These eccentrics are placed at the corners of a triangle outside the openings in the support 6, and furthermore in the gyratory frame 7, for the logs that two thereof are generally at the same level on the gyratory frame and the third one is at a lower level and is generally halfway between the two upper eccentrics, this being best seen from FIG. 2. Using eccentrics 9 the gyratory frame may be moved gyratorily in a plane, normal to the center line 5 and thereabout so that any point on said frame is moved in a circle with a radius equal to the overall eccentricity e', as fixed by adjustment of eccentrics 9.

In the gyratory frame 7 the cutting ring 8 is bearinged, i.e. supported on bearings for rotation about an axis, fixed in relation to the gyratory frame 7 and generally normal to the plane thereof. The cutting ring 8 is powered by a motor 10 or driving unit fixed to gyratory frame 7 by way of a belt 11 trained round the ring 8. The ring has cutting tools 12 with a milling function for cutting the wood.

The eccentrics 9 are the same in all respects, but for the fact that the lower eccentric 9 has no driving unit 13 as used for the top ones. Each eccentric is made up of a crank 14 (FIG. 3) whose one, right-hand end is bearinged in support 6, an eccentric disk 15 having an eccentric hole 16 or eccentric point, at which it is rotatably supported on the crank tennon or pin 17 on the other end of crank 14, the circumferential face of the eccentric disk being bearinged within gyratory frame 7, and a cluch 18, which may be actuated at will and which is only shown roughly in FIG. 3. This clutch 18 is used for releasably fixing the eccentric disk 15 in any desired selected angular position in relation to crank pin 17.

In FIGS. 3 and 4 the crank throw between the axis of rotation of crank 14, at its one end bearinged in support 6 and the central axis of crank pin 17 on the other is shown marked 1. The eccentricity of the eccentric disk 15, that is to say the distance between the center of its hole (marked at 16) and the middle point of the eccentric disk (which is also the middle point of its circumferential face) is marked e. In order to be able to make full use of the diameter D of the cutting ring for the diameter d of the wood cut, 1 and e are of the same size. The purpose of this part of the design will be made clear later in connection with FIG. 4.

The driving system 13 or unit by which the two top eccentrics 9 may be turned about axis 19 of the crank 14 is made up of a worm wheel 21 keyed on the crank shaft 20 of each eccentric 9, a worm shaft 22 common to the two worm wheels 21 of the top eccentrics 9 and a driving motor 23 for the shaft 22. The relation between the speed of rotation of the eccentrics to the speed of rotation of the cutting ring 8 is selected to be in line with the rate of forward motion of the logs and the design of the tools, the sort of wood being important as well. Normally this relation or ratio will be less than one.

The eccentricity of throw of each eccentric 9 results from the selected position of the eccentric disk 15 in relation to the crank pin 17 on which it is placed.

FIG. 4 gives three different adjustment positions so as to give three different sizes of the overall eccentric motion e'. The adjustment is so undertaken that all three eccentrics 9 have the same overall eccentricity.

In FIG. 4 on the right diagrammatically it is possible to see the adjustment made of the eccentrics 9 while on the left opposite to these parts of the figure it is possible to see the milling effect on the log with the adjustment made so as to get a decreased diameter d on the log. The log is to be seen end on in FIG. 4 with the log moving out of the plane of the figure. Because of this view with the thin end of the log first moving into the machine it is possible to see in FIG. 4 those parts of the log which have a greater diameter than the diameter d which is to be produced on the log, these parts of the wood not having reached as yet the cutting ring. It will be seen that these parts of the log, outside the diameter d in FIG. 4, are not regular.

Figures 1, 4A:
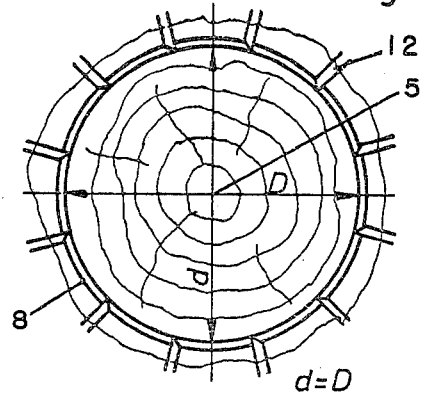
Figures 2, 4A:
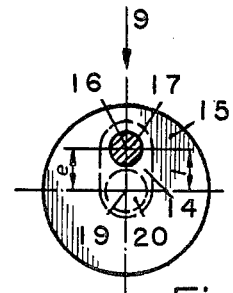

In FIG. 4a the adjustment made is such that the middle point of the eccentric disk is lined up with the center axis 19 of crank shaft 20, this being possible because the acting crank length 1 and the distance e between the center of the circumference of the eccentric disk and the center of the hole therein are equal in size. In this case the overall eccentricity e' will be equal to zero, that is to say the middle point of the circumference of the eccentric disk 15 will be on the middle axis 19 of the crank shaft 20 so that when the two top eccentrics 9 are turned there will be no gyratory motion of the frame 7. As the log is moved through the cutting ring 8 which is in this case only rotating about a fixed axis but not otherwise moving about center line 5, the wood only will be cut back to the full diameter D of the ring at those parts of the log, which are greater than this diameter.

Figures 1, 4B:
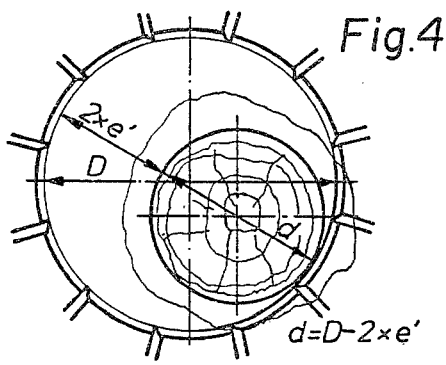
Figures 2, 4B:
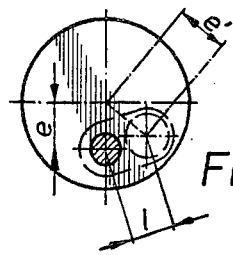
Figures 1, 4C:
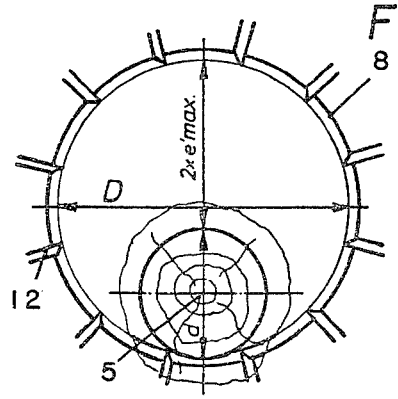
Figures 2, 4C:
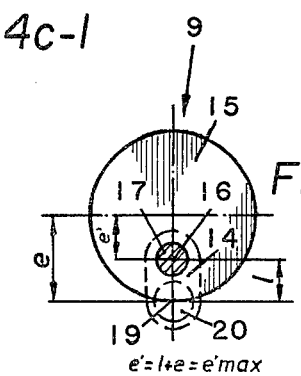

In FIG. 4c the adjustment made is such that the smallest value of d ($d_{min}$) is produced at the other end of the scale. For this purpose eccentric disk 15 is fixed on the crank pin 17 at such an angle that the middle of the circumference of the eccentric disk, the eccentric hole 16 and the middle axis 19 of the crank shaft 20 are in a straight line or a single plane as in FIG. 4a, the two distances e and 1 however being added together to get the greatest possible size of the eccentricity e' (that is to say $e'_{max}$) so that the turning eccentrics 9 have the effect of gyratorily moving the gyratory frame 7 with the greatest possible eccentric motion e' in relation to the center line 5 and so that the cutting ring 8 on being moved in a circle round the log will be moved more deeply into the wood by the greatest value of e' (that is to say $e'_{max}$) than is the case when the gyratory frame as in figure (a) is not moved, the sticking out parts of the wood being cut back to the smallest possible diameter d (that is to say $d_{min}$).

FIG. 4b is used to make clear an adjustment somewhere between the two ends of the possible scale of adjustment. In such inbetween adjustments the eccentric point 16, the middle point of the circumference of eccentric disk 15 and the middle axis 19 of the crank shaft 20 are not in a common plane, the outcome being a size of the overall eccentricity e' somewhere between the ends of the scale, that is to say somewhere between zero and the greatest value of e'. For this reason the wood is cut back to a diameter value of d between the zero value of d and the greatest possible value thereof. Between these values it is possible to get any desired value of e' with a representative diameter d.

For changing the adjustment it is best firstly for the top eccentrics 9 to be turned into a position and stopped in which the eccentric point 16 is right over the middle point of the circumference of the eccentric disk 15 and when, in this position, clutch 18 is unclutched, the eccentric disks 15 will be kept by their own weight in this position on the stopped cranks so that, as the clutches are unclutched, there will be no fear of the gyratory frame falling sharply a greater or lesser distance. The next stage is then that of lowering or lifting the crank pins 17 so that the size of the overall eccentricity e' is changed to a desired value because the disks 15 are kept by the force of gravity in their orientatation while the crank pins are turned in relation to them in angle. To make it simpler to make such adjustments, the system is best so designed that the driving unit 13 for the two top eccentrics 9 may be turned in one direction or the other as desired.

Figure 5:
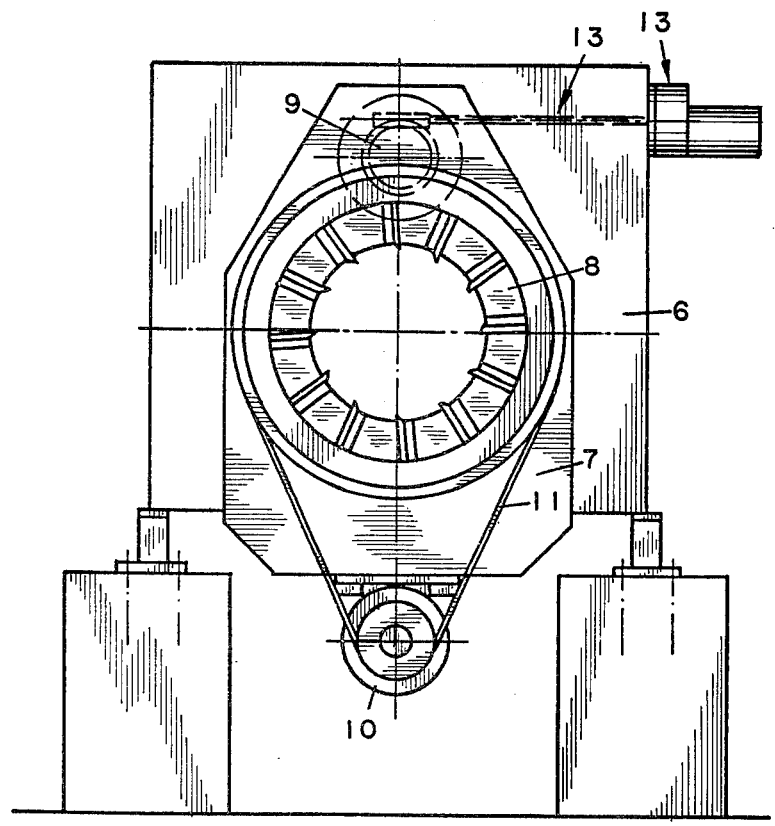
FIG. 5 is an end-on view, on the same lines as FIG. 2, of a further machine of the present invention which is somewhat simpler than that to be seen in FIGS. 1 and 2.

In the working example of FIG. 5, unlike that of FIGS. 1 to 3, there is only one eccentric 9 placed over the highest point of the cutting ring 8. This single eccentric 9 may be of the same design as the eccentrics in the machines of FIGS. 1 to 3.

The gyratory motion of the frame 7 supporting the cutting ring 8 may, generally speaking, be produced in other ways without using eccentrics whose eccentricity may be changed. It will be possible to make use of lever systems, cross slides and other systems for producing the same effect which in the present working examples is produced with adjustable eccentrics. The use of eccentrics however is responsible for achieving best effects with respect to cutting out trouble conditions in operation and getting a long working life.

I claim:

1. A log shaping machine for cutting logs to desired diameter, said machine comprising:
    means for guiding a log to be shaped longitudinally along a center line through the machine;
    a cutting ring mounted for rotation about the line of guiding of the log;
    a driving unit coupled to and rotating said ring;
    cutting tools on said ring engageable with the log;
    a gyratory frame supporting said cutting ring for selective displacement of the ring and its axis of rotation with respect to the line of guiding of the log, means driving said frame in a gyration motion, whereby the effective cutting path of said cutting tools with respect to the log is changed.

2. The machine as claimed in claim 1 having a support for said frame fixed in position in relation to said line, an eccentric placed generally over the middle of said cutting ring, said eccentric joining said frame with said support, a system for rotating said eccentric.

3. The machine as claimed in claim 2 having three such eccentrics joining with three points on said frame at the corners of an equal-sided triangle.

4. The machine as claimed in claim 2 wherein the said eccentric is made up of a crank having two ends and bearinged at one thereof in said support of said machine, an eccentric disk placed turningly on said second crank end so that an outer face of said eccentric disk is eccentric in relation to said second end, means for locking said eccentric disk on said second crank end so that said outer face of said eccentric disk may be made more and less eccentric in relation to said first crank end, the outer face of said eccentric disk being eccentric in relation to said second crank end by a distance equal to at least the acting crank length of said crank, and further being bearinged in said frame.

5. The machine as claimed in claim 3 wherein each said eccentric is made up of a crank having two ends and bearinged at one thereof in said support of said machine, an eccentric disk placed turningly on said second crank end so that an outer face of said eccentric disk is eccentric in relation to said second end, means for locking said eccentric disk on said second crank end so that said outer face of said eccentric disk may be made more and less eccentric in relation to said first crank end, the outer face of said driving wheel being eccentric in relation to said second crank end by a distance equal to at least the acting crank length of said crank, and further being bearinged in said frame.

6. The machine as claimed in claim 5 having on each eccentric disk a clutch such that said eccentric disk may be turned on said second crank end and locked in a new position thereon for adjustment of the eccentric motion of said eccentric disk.

* * * * *